US008896946B2

United States Patent
Tsai et al.

(10) Patent No.: US 8,896,946 B2
(45) Date of Patent: Nov. 25, 2014

(54) COLOR FILTER, APPLICATIONS THEREOF AND METHOD FOR MANUFACTURING THE SAME

(75) Inventors: Yao-Chou Tsai, Hsinchu (TW);
Fang-An Shu, Hsinchu (TW);
Wen-Chung Tang, Hsinchu (TW);
Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 186 days.

(21) Appl. No.: 13/351,543

(22) Filed: Jan. 17, 2012

(65) Prior Publication Data
US 2012/0293882 A1 Nov. 22, 2012

(30) Foreign Application Priority Data
May 16, 2011 (TW) .................................. 100117083

(51) Int. Cl.
*G02B 5/22* (2006.01)
*G02B 5/20* (2006.01)
(52) U.S. Cl.
CPC ................ *G02B 5/201* (2013.01); *G02B 5/223* (2013.01); *Y10S 359/90* (2013.01)
USPC ............................ 359/891; 359/892; 359/900
(58) Field of Classification Search
None
See application file for complete search history.

(56) References Cited

U.S. PATENT DOCUMENTS 5,686,383 A * 11/1997 Long et al. .................... 503/227
7,701,533 B2 * 4/2010 Kobayashi et al. ........... 349/106

FOREIGN PATENT DOCUMENTS

| CN | 1880982 A | 12/2006 |
| CN | 101251714 A | 8/2008 |
| CN | 101833218 A | 9/2010 |
| JP | 2001-91721 A | 4/2001 |

OTHER PUBLICATIONS

China Patent Office, "Office Action", Feb. 7, 2014.

* cited by examiner

Primary Examiner — Jade R Chwasz
(74) Attorney, Agent, or Firm — WPAT, PC; Justin King

(57) ABSTRACT

A color filter suitable for being disposed on a substrate is provided. The color filter includes a plurality of pixel units separately disposed on the substrate so as to define a plurality of blank regions thereon. A color display apparatus applying the color filter is also provided, wherein the color display apparatus includes a driving circuit substrate, the color filter and a display medium layer. The color filter is disposed on the driving circuit substrate. The display medium layer is disposed between the driving circuit substrate and the color filter.

15 Claims, 5 Drawing Sheets

COLOR FILTER, APPLICATIONS THEREOF AND METHOD FOR MANUFACTURING THE SAME

FIELD OF THE INVENTION

The present invention relates to a color filter of a display apparatus, a method for manufacturing the same, and more particularly to a color filter which could prevent color mixture pigments, a method for manufacturing the same and applications thereof.

BACKGROUND OF THE INVENTION

FIG. 1A is a cross sectional view of a typical electrophoretic display apparatus 100. Referring to FIG. 1A, the typical electrophoretic display apparatus 100 includes a driving circuit 102 disposed on a substrate 101, an electrophoretic layer 103 disposed on the driving circuit 102, and a color filter layer 104 disposed on the electrophoretic layer 103. The color filter layer 104 is formed by steps as follows: A plurality of color filter films, such as filter films 104r, 104g and 104b, are sequentially disposed on predetermined positions of the electrophoretic layer 103 by a heat transfer printing process, and a transparent protecting layer 105 is subsequently adhered on the color filter layer 104 by an adhering layer 106.

FIG. 1B is a top view of the color filter layer 104 shown in FIG. 1A. Referring to FIG. 1B, after the transparent protecting layer 105 and the color filter layer 104 is adhered together by the adhering layer 106, the pigments of the color filter films 104r, 104g and 104b may fad and mix with each other, and problems of color mixture and color distortion in pigments may thus occur when the color filter layer 104 is formed.

Therefore, there is a need to provide an improved color filter and its manufacturing method to solve the drawbacks and problems encountered from the prior art.

SUMMARY OF THE INVENTION

One aspect of an embodiment of the present invention is to provide a color filter, a method for manufacturing the same and applications thereof to prevent pigments fading and color mixture occurs.

The color filter suitable for being disposed a substrate includes a plurality of pixel units. The pixel units are separately disposed on the substrate so as to define a plurality of blank regions thereon.

In one embodiment of the present invention, the blank region is surrounded by at least three of the pixel units.

In one embodiment of the present invention, each of the pixel units includes a plurality of color filter films.

In one embodiment of the present invention, each of the color filter films is selected from a group consisting of a green filter film, a blue filter film, and a red filter film.

In one embodiment of the present invention, the color filter further includes a transparent protecting layer disposed the pixel units.

In one embodiment of the present invention, the color filter further includes an adhering layer disposed between the pixel units and the transparent protecting layer.

Another aspect of an embodiment of the present invention further provides a color display apparatus, and the color display apparatus includes a driving circuit substrate, a color filter and a display medium layer. The color filter is disposed on the driving circuit substrate and includes a plurality of pixel units. The pixel units are separately disposed on the substrate so as to define a plurality of blank regions thereon. The display medium layer is disposed between the driving circuit substrate and the color filter.

A further aspect of an embodiment of the present invention is to provide a method for manufacturing a color filter suitable for being disposed on a substrate in order to solving the long-existing problems of color mixture in pigments, and the method includes steps as follows: A plurality of pixel units are separately formed on the substrate, so as to define a plurality of blank regions.

In an embodiment of the present invention, a transparent protecting layer is formed on the pixel units.

In an embodiment of the present invention, an adhering layer is formed between the pixel units and the transparent protecting layer.

In an embodiment of the present invention, each of the pixel units includes a plurality of color filter films, and the color filter films are formed by a heat transfer printing process.

In an embodiment of the present invention, the heat transfer printing process includes a laser transfer printing process.

In accordance with the aforementioned embodiments of the present invention, a color filter including a plurality of pixel units is provided, and the pixel units are separately formed on a substrate to define a plurality of blank regions for holding some color fading spaces, so as to prevent color mixture and color distortion in pigments during manufacturing the color filter.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
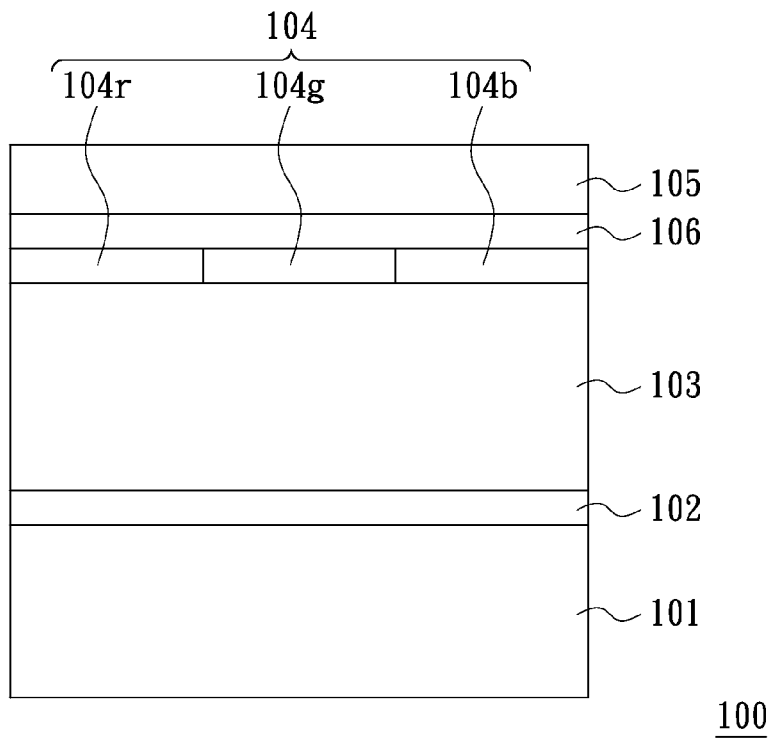
FIG. 1A is a cross sectional view of a typical electrophoretic display apparatus.
Figure 1B:
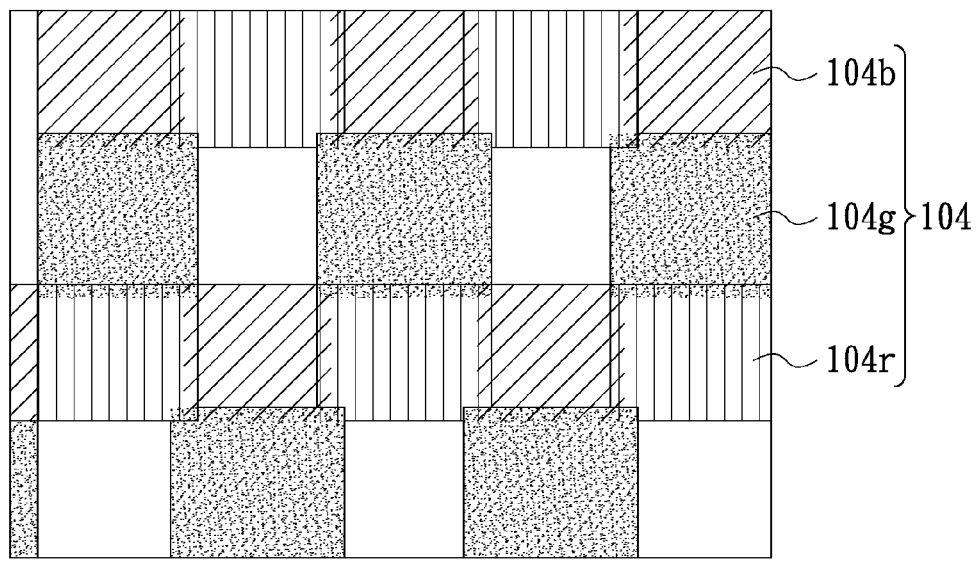
FIG. 1B is a top view of the color filter layer shown in FIG. 1A.
Figure 2A:
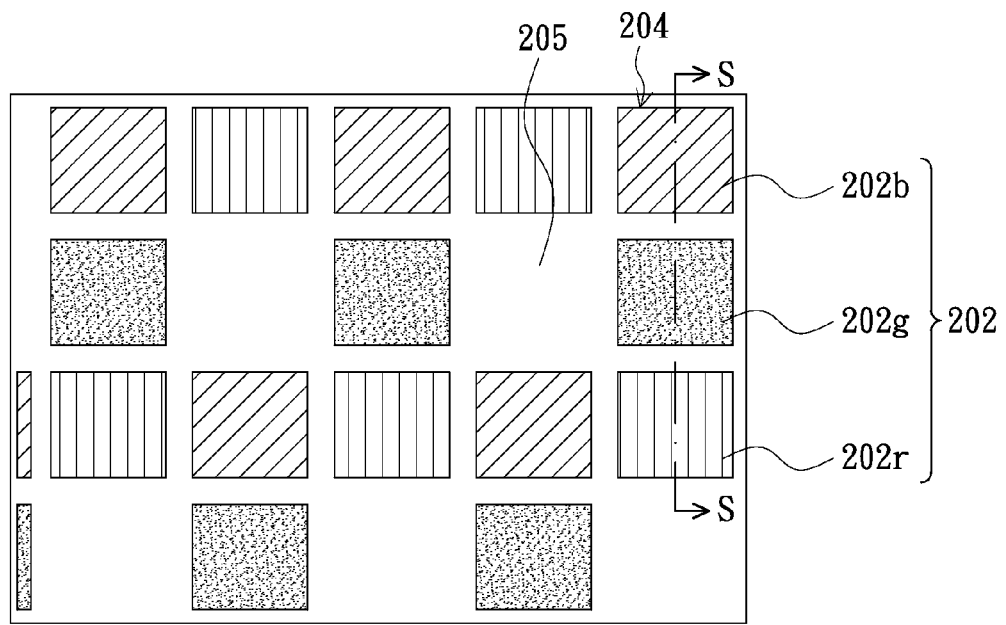
FIG. 2A illustrates a top view of a color filter according to an embodiment of the present invention.
Figure 2B:
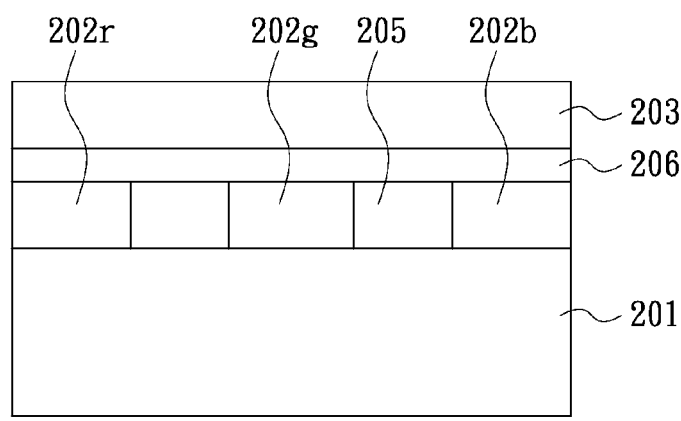
FIG. 2B is a cross sectional view of the color filter taken along line S of FIG. 2A.

FIG. 2A illustrates a top view of a color filter 200 according to an embodiment of the present invention. FIG. 2B is a cross sectional view taken along line S of FIG. 2A.

The color filter 200 includes a substrate 201, a plurality of pixel units 202 and a transparent protecting layer 203. The substrate 201 includes a plurality of pixel regions 204 and a plurality of blank regions 205. The blank regions 205 are disposed between the pixel regions 204. The pixel units 202 are disposed in the pixel regions 204, respectively. The transparent protecting layer 203 is disposed on the pixel units 202.

More concretely, the blank regions 205 are defined by a plurality of, preferably but not limited to three of, the pixel units 202 formed on the substrate 201 and surrounding the blank regions 205. Each of the pixel units 202 is composed by a plurality of separated color filter films. In this embodiment, the each of the pixel units 202 may simultaneously includes a green filter film 202g, a blue filter film 202b, a red filter film 202r and other filter films with the colors other than green, blue and red. In other embodiments, each of the pixel units 202 may also be composed by color filter films with one single color. The transparent protecting layer 203 is disposed on the pixel units 202 by an adhering layer 206 disposed between the pixel units 202 and the transparent protecting layer 203. The transparent protecting layer 203 may be made of acryl or epoxy resin. In the embodiment, the color filter 200 includes the substrate 201, but in other embodiment, the color filter 200 can include pixel units 202 directly disposed on the display medium layer without the substrate 201.

It should be noted that, the size of each of the color filter films are not limited by the present invention. For example, the size of each of the color filter films 202g, 202b and 202r are configured in the same size. However, in some other embodiments of the present invention, each of the color filter films may have different size.

Figure 2C:
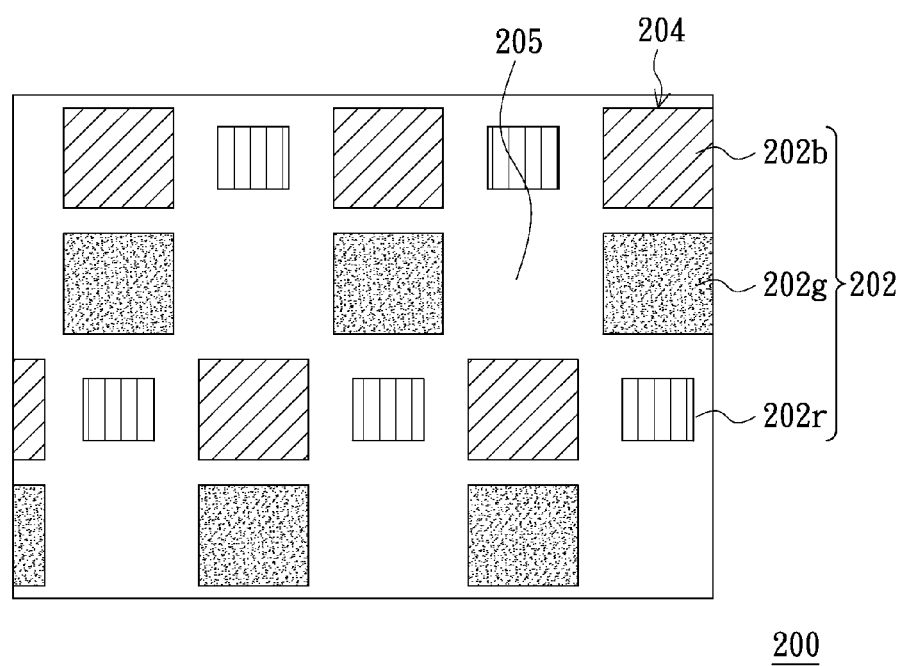
FIG. 2C is a cross sectional view of a color filter according to another embodiment of the present invention.

FIG. 2C illustrates a cross sectional view of a color filter according to another embodiment of the present invention. In the present embodiment, the green filter film 202g, the blue filter film 202b and the red filter film 202r which are disposed in the pixel unit 202 have different size. For example, both of the green filter film 202g and the blue filter film 202b have a size greater than that of the red filter film 202r. However, it should be appreciated that the size of the color filter films 202g, 202b and 202r shown in FIG. 2C is just illustration but not limited to what it depicts. In other embodiments, the size of the red filter film 202r may be the greatest and greater than the areas of other filter films.

In addition, the positions of the color filter can be varied rather than limited to what the preferred embodiments depict, and various modifications and arrangements in the positions of the color filter may included within the spirit of the present invention.

In order that the person of ordinary skill in the art could know more about the present invention, the method for manufacturing a color display apparatus 300 applied such color filter 200 is taken as a preferred embodiment to detailed describe the features, advantages and the use of the present invention.

Figure 3A:
FIGS. 3A to 3C are cross sectional views partially illustrating the method for manufacturing the color display apparatus.
Figure 3B:
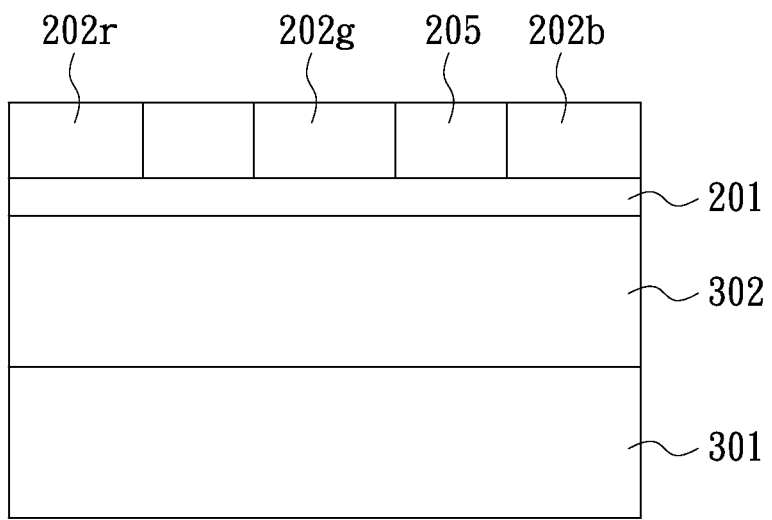
Figure 3C:
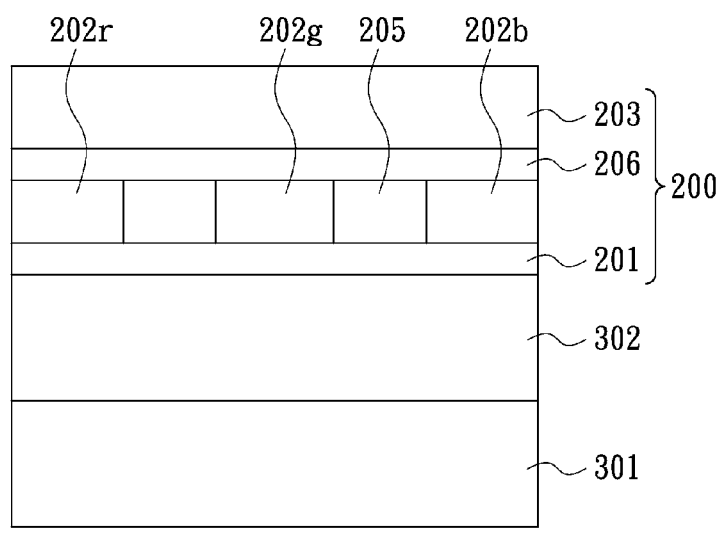

FIGS. 3A to 3C are cross sectional views showing partially illustrating the method for manufacturing the color display apparatus 300. Referring to FIG. 3A, a driving circuit substrate 301 is provided. The driving circuit substrate 301 may be an active element array substrate or a passive element array substrate. Then, a display medium layer 302 is formed on the driving circuit substrate 301. The display medium layer 302 may be a liquid crystal layer, an electrophoretic layer, an electro-wetting layer, or an organic electro-luminescence layer.

Referring to FIG. 3B, the color filter 200 is then formed on the display medium layer 302. The step of forming the color filter 200 includes steps as follows: A substrate 201 is provided, and then at least three pixel units 202 are formed on the substrate 201 so as to define at least a blank region 205 on the substrate 201. In other embodiment, the pixel units 202 of the color filter 200 can directly be disposed on the display medium layer 302 without substrate 201.

Each of the pixel units 202 includes a plurality of separated color filter films. In this embodiment, each of the pixel units 202 may simultaneously includes a green filter film 202g, a blue filter film 202b, a red filter film 202r and other filter films with the colors other than green, blue and red. In other embodiments, each of the pixel units 202 may also be composed by color filter films with one single color. The color filter films may be formed by a heat transfer printing process, such as a laser transfer printing process, by which color pigments are heated to be partially evaporated and deposited on the corresponding positions of the pixel units 202.

Subsequently, the transparent protecting layer 203 is disposed on the pixel units 202 by an adhering layer 206, meanwhile the color display apparatus 300 shown as FIG. 3C is formed. In some embodiments of the present invention, the transparent protecting layer 203 may be made of acryl or epoxy resin.

Referring to FIG. 3C, the color display apparatus 300 manufactured by aforementioned processes includes the driving circuit substrate 301, the color filter 200 and the display medium layer 302. The color filter 200 is disposed on the driving circuit substrate 301. The display medium layer 302 is disposed between the driving circuit substrate 301 and the color filter 200. The driving circuit substrate 301 may be an active element array substrate or a passive element array substrate. The display medium layer 302 may be a liquid crystal layer, an electrophoretic layer, an electro-wetting layer, or an organic electro-luminescence layer.

As mentioned above, the embodiments of the present invention provides a color filter which could prevent color mixture and color distortion in pigments, a color display apparatus applied such color filter and a method for manufacturing the color filter and the color display apparatus.

In accordance with the aforementioned embodiments of the present invention, a color filter including a plurality of pixel units is provided, wherein the pixel units are separately formed on a substrate to define a plurality of blank regions for holding some color fading spaces, so as to prevent color mixture and color distortion in pigments during manufacturing the color filter.

In addition, because the pigments for manufacturing the color filter films with different colors have different fading degrees, thus in the present invention, the size of each color filer films may be varied in order to keep the white balance of the entire image and prevent color mixture caused by pigments fading. Therefore, the problems of color mixture and color distortion in pigments could be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color filter suitable for being disposed on a substrate, the color filter comprising:
   a plurality of pixel units separately disposed on the substrate, wherein each of the plurality of pixel units comprises a plurality of color filter films spaced from each other;
   wherein the plurality of color filter films are separately formed on the substrate to define a plurality of blank regions for holding some color fading spaces, the blank regions are located between every two adjacent color filter films and are completely vacant, so as to prevent color mixture and color distortion in pigments during manufacturing the color filter.

2. The color filter according to claim 1, wherein the blank region is surrounded by at least three of the pixel units.

3. The color filter according to claim 1, wherein each of the color filter films is selected from a group consisting of a green filter film, a blue filter film, and a red filter film.

4. The color filter according to claim 1, further comprising a transparent protecting layer disposed on the pixel units.

5. The color filter according to claim 4, further comprising an adhering layer disposed between the pixel units and the transparent protecting layer.

6. The color display apparatus according to claim 5, wherein the color filter further comprises a transparent protecting layer disposed on the pixel units.

7. The color display apparatus according to claim 5, wherein the color filter further comprises an adhering layer disposed between the pixel units and the transparent protecting layer.

8. A color display apparatus comprising:
    a driving circuit substrate;
    a color filter disposed on the driving circuit substrate and comprising:
        a plurality of pixel units separately disposed on the substrate, wherein each of the plurality of pixel units comprises a plurality of color filter films spaced from each other, wherein the plurality of color filter films are separately formed on the substrate to define a plurality of blank regions for holding some color fading spaces, the blank regions are located between every two adjacent color filter films and are completely vacant, so as to prevent color mixture and color distortion in pigments during manufacturing the color filter; and
    a display medium layer disposed between the driving circuit substrate and the color filter.

9. The color display apparatus according to claim 8, wherein the blank region is surrounded by at least three of the pixel units.

10. A method for manufacturing a color filter suitable for being disposed on a substrate, comprising:
    separately forming a plurality of pixel units on the substrate, wherein each of the plurality of pixel units comprises a plurality of color filter films spaced from each other, the plurality of color filter films are separately formed on the substrate to define a plurality of blank regions for holding some color fading spaces, the blank regions are located between every two adjacent color filter films and are completely vacant, so as to prevent color mixture and color distortion in pigments during manufacturing the color filter.

11. The method for manufacturing the color filter according to claim 10, further comprising forming a transparent protecting layer on the pixel units.

12. The method for manufacturing the color filter according to claim 11, further comprising forming an adhering layer between the pixel units and the transparent layer.

13. The method for manufacturing the color filter according to claim 10, wherein the blank region is surrounded by at least three of the pixel units.

14. The method for manufacturing the color filter according to claim 10, wherein the color filter films is formed by a heat transfer printing process.

15. The method for manufacturing the color filter according to claim 14, wherein the heat transfer printing process includes laser transfer printing process.

\* \* \* \* \*